Inventor
John O. Smith
By his Attorney

United States Patent Office 3,382,103
Patented May 7, 1968

3,382,103
METHOD OF SUPPLYING AQUEOUS HYDRAZINE TO A VAPOR DIFFUSION FUEL CELL ELECTRODE
John O. Smith, Swampscott, Mass., assignor to Monsanto Research Corporation, St. Louis, Mo., a corporation of Delaware
Filed May 19, 1964, Ser. No. 368,579
6 Claims. (Cl. 136—86)

ABSTRACT OF THE DISCLOSURE

An improved method for operating a fuel cell wherein an aqueous solution of hydrazine is employed as a fuel in conjunction with an oxidant feedstock. Improvement operation and efficiency of such fuel cells is realized by supplying the aqueous solution of hydrazine to the anode through a barrier consisting of three layers; the first layer is a porous, non-wetting vapor transmitting layer, the second layer contains a metallic catalyst for hydrazine decomposition while the third layer is a current collector for the anode.

---

Figure 1:
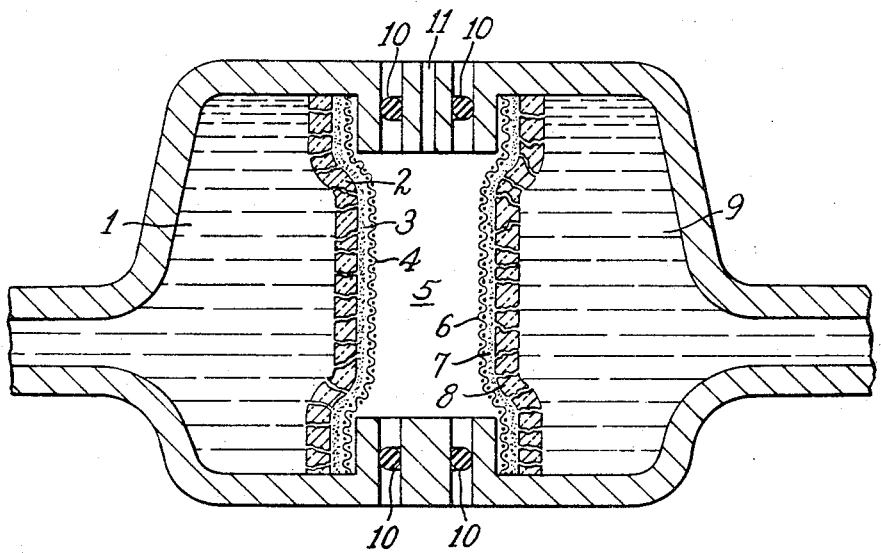

This invention relates to a fuel cell, and more particularly, provides a novel method of construction and operation of a fuel cell with liquid and soluble feedstocks.

Operation of a fuel cell to produce electrical energy involves supplying fuel and oxidant to electrodes in a system providing electrolytic contact between the electrodes within the cell and electronic contact between the electrodes outside the cell. The fuel and oxidant are fed to the electrodes as these feedstocks are consumed in the operation of the cell and reaction products are removed as they are formed, to maintain a substantially invariant system which can operate continuously.

The feedstocks for the cell, comprising the fuel and the oxidant, may each be gases, such as hydrogen and oxygen. Alternatively, liquid and soluble materials may be used, which dissolve in or are miscible with the electrolyte to form a homogeneous fluid mixture.

It is essential to the electrochemical reaction that the feedstock, electrolyte and electrode all be in contact simultaneously. In catalytic electrodes, the catalyst surface must contact the feedstock and electrolyte.

For gaseous feedstocks, while the feedstock is gas phase, the electrode is solid phase, and the electrolyte may be liquid phase. To achieve the necessary triple contact, gas diffusion electrodes are used. These are porous electrodes through which the feedstock gas is fed to contact the electrolyte in the presence of the catalytic electrode. This involves a delicate balance of the gas pressure to maintain the gas-electrolyte interface at the catalytic electrode surface. The electrolyte must be prevented from entering and flooding the pores of the electrodes to the extent that the gas cannot effectively reach the catalyst surface. Still, the electrolyte must be allowed to wet the electrodes sufficiently to be present at the catalyst surface. Slight variations in the gas pressure may thus interfere seriously with operation of the cell.

For liquid and soluble feedstocks, obtaining simultaneous contact of the feedstock, the electrolyte and the electrode is not a problem. The feedstocks form a homogeneous mixture with the electrolyte. Simply immersing the catalytic electrode in this mixture is sufficient to produce the desired contact of three, and allow the electrochemical reaction to occur.

With liquid and soluble feedstocks, however, it is usually necessary to prevent gross mixing of the fuel and oxidant. If they mix in the electrolyte, the fuel and oxidant may react chemically, rather than electrochemically, resulting in a loss of energy. Moreover, the presence of one may interfere with electrochemical utilization of the other. Accordingly, provision must generally be made to separate the fuel and oxidant electrode compartments. This leads to high internal resistance of the cell, which reduces its energy output.

Hydrazine is a potential fuel cell feedstock of the soluble and liquid type. This fuel material is particularly suitable for fuel cells to be used in rockets and like space vehicles. Hydrazine is a rocket propellant material, and is advantageous in this connection because it is non-cryogenic and readily storable. By using hydrazine both for the rocket propulsion system and for the fuel cell fuel, it is possible to draw from a single storage tank for both propellant power and electrical power, thus simplifying the rocket system. The nitrogen generated by this fuel at the anode during fuel cell discharge may also be utilized in rocket operation, if desired.

To obtain reasonable electrical energy yields from hydrazine in a fuel cell, it is necessary to catalyze its electrochemical oxidation. Catalysts have been found, such as rhodium, which are effective for this purpose. However, when the catalytic electrode remains immersed in a hydrazine electrolyte solution during continuous operation of cells employing this fuel, it is found that the electrochemical catalytic activity of the electrode decreases over a period of time. Thus operation of a cell with the electrode immersed in a solution of this fuel has been found disadvantageous, since the cell power output drops off as a result of this catalyst instability. Further, some electrochemical hydrazine catalysts, such as an active Pt black, have the drawback of also catalyzing the chemical, that is, the nonelectrochemical decomposition of hydrazine.

The oxidant coupled with hydrazine in a fuel cell can advantageously be nitric acid. This oxidant can be electrochemically reduced even in the absence of a metallic catalyst under some conditions. However, this fuel and oxidant couple should not be allowed to mix: the presence of hydrazine may interfere with and prevent the electrochemical reduction of the nitric acid.

It is an object of this invention to provide improved fuel cell systems and methods of operating the same employing liquid and soluble feedstocks.

A particular object of this invention is to provide a novel system of operating a fuel cell employing hydrazine as a feedstock.

These and other objects will become evident upon consideration of the following specification and claims.

In accordance with the present invention, a novel method of operating fuel cells employing liquid and soluble feedstocks is provided, comprising supplying liquid feedstock to an electrode comprising a porous, vapor-transmitting barrier to liquid flow located between the feedstock and the catalytic electrode surface contacting the electrolyte. The prevents contact of the feedstock in the liquid state with the catalytic electrode while permitting transport of the feedstock as a vapor to the catalytic electrode surface.

Figure 2:
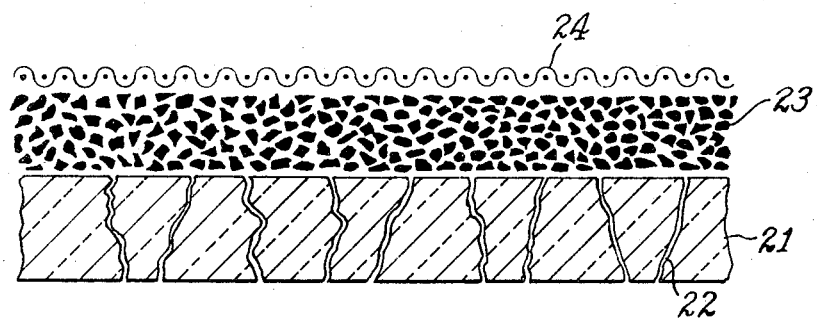

The invention will be more readily understood by consideration of the drawings, in which:

FIGURE 1 is a diagrammatic cross-sectional view of the fuel cell of the invention, and FIGURE 2 is a diagrammatic enlarged cross-section of the diffusion electrode of the invention.

The stated arrangement provides a vapor diffusion electrode used in conjunction with liquid and soluble feedstocks. Considering that, with such feedstocks, it is merely necessary to immerse the electrode in the mixture of feedstock and electrolyte to obtain electrochemical reaction, the use of a porous diffusion electrode as presently employed would appear unnecessary and indeed, disadvantageous, what with the problems of electrode flooding and the like posed by gas diffusion electrodes. In fact, however, it has been found that the presently provided arrangement affords substantial advantages for operation of fuel cells.

The above-described method of operating a fuel cell is particularly applicable to hydrazine-fueled cells, and still more specifically, to cells employing ruthenium as a catalyst for electrochemical oxidation of hydrazine. It has now been found that ruthenium is an unexpectedly active electrochemical catalyst for hydrazine, but has the disadvantage of also catalyzing decomposition of hydrazine.

In the arrangement of the present invention, the feedstock reaches the catalyst and electrolyte only as a vapor: the porous barrier between the feedstock supply and the catalyst prevents liquid flow. Consequently, the catalyst on the inside of the porous barrier to liquid flow is kept out of contact with the bulk of the feedstock, which is located outside of the porous barrier. This results in an advantageous suppression both of any catalytic decomposition of the feedstock by contact with the catalyst, and of poisoning of the catalyst by contact with the feedstock.

With liquid hydrazine as fuel, it is found that the stated effects of the diffusion electrode incorporating a porous barrier to liquid flow make possible the effective utilization of highly active catalytic electrodes, and particularly, ruthenium electrodes. Decomposition of the hydrazine is restricted to a tolerable amount. Moreover, the electrochemical activity of the catalyst remains stable: unlike some catalytic electrodes immersed in hydrazine electrolyte solutions, it does not polarize over a period of time to any substantial extent, but remains at its original, favorable potential.

The above-described diffusion electrode structure exhibits similar advantages for use with an oxidant such as hydrogen peroxide. The potential of hydrazine in an alkaline electrolyte is more favorable than in acid. Hydrogen peroxide is compatible with alkaline electrolytes, and is used in rocket propellant systems, so that it may be readily available in the same spacecraft environment as is hydrazine. This oxidant, like hydrazine, is susceptible to catalytic decomposition by catalysts of its electrochemical utilization. With a diffusion catalytic electrode as here provided, contact of this liquid oxidant with the catalyst is minimized, thus suppressing its decomposition and inhibiting polarization of the catalytic electrode resulting from contact with the feedstock.

A further advantage of the present cells for utilizing liquid reactants is that there is little or no mixing of the fuel and oxidant feedstocks. Diffusion of the feedstock to the electrolyte is limited by the presence of the porous barrier at the electrode. As the feedstock reaches the catalyst, it may be consumed, either by electrochemical reaction or by processes such as decomposition. As a result, no substantial mixing of the feedstocks occurs.

At the same time, the present arrangement retains the advantages of cells operating on liquid and soluble feedstocks. As the feedstock reaches the catalyst/electrolyte interface, at least where a liquid electrolyte is employed, it can mix with and dissolve in the electrolyte, thus retaining the advantageous ability of liquid and soluble feedstocks to produce readily the necessary simultaneous triple contact of catalytic electrode, feedstock and electrolyte. At the outside face of the separator, the bulk of the feedstock remains in the liquid phase, retaining the advantageous handling characteristics of liquid materials, as compared to gaseous fuel requirements of heavy pressure containers.

Referring now to the drawings, FIGURE 1 is a diagrammatic cross-sectional view of the fuel cell of the invention in which 1 is a supply of fluid fuel, 2 is a porous barrier to liquid flow, 3 is a layer of catalytic material, 4 is a screen current collector, 5 is an electrolyte, 6 is a current collector, 7 is a layer of catalyst, 8 is a porous barrier to liquid flow, and 9 is a supply of oxidant. 10, 10 are O-ring spacers and 11 is a vent.

FIGURE 2 shows the details of the electrode structure, in enlarged diagrammatic scale, in which 21 is the porous vapor-transmitting barrier to liquid flow, 22 is a pore through which the feedstock may pass in the vapor phase, 23 is a layer of catalyst, such as a noble metal, which may be in the form of a particulate black, and 24 is a screen current collector.

In operation, the feedstock contacts the porous barrier which is wet-proof, and thus prevents the passage of the feedstock in the liquid phase, but permits its entrance to the pores in the vapor phase. The feedstock is transported through the porous barrier in the vapor phase, to reach the catalyst layer on the electrolyte side of the barrier. The catalyst is contacted by the electrolyte, which provides electrolytic contact between the two electrodes of the cell. On the other electrode, in the case where both electrodes are vapor diffusion electrodes employed with liquid and soluble electrolytes in accordance with the present invention, as illustrated in FIGURE 1, the process is the same as that just described. Alternatively, other known means for supplying the feedstock to the second electrode contacting the electrolyte may be used, such as feeding gas through a gas diffusion electrode contacting the electrolyte.

When the electrodes are now electronically connected through an external circuit, electrical current will flow through the circuit, while the fuel feedstock is electrochemically oxidized and the oxidant feedstock is electrochemically reduced at the corresponding respective catalytic electrode surfaces. Means (not shown) will be provided for removing reaction products of the invention, such as nitrogen produced from hydrazine, and means (not shown) provided for supplying the fuel and oxidant to the corresponding electrodes, to maintain the cell under invariant conditions: for example, these may be vents and pumps, respectively.

Referring now in more detail to operation of the present cells, at least one electrode in fuel cells built and operated in accordance with the present invention will be a catalytic diffusion electrode consisting essentially of a porous, vapor-transmitting barrier to liquid flow, and an electrochemical catalyst and means for current collection at one surface of said porous barrier.

The porous barrier should be constructed of a non-wetting material, to provide the ability to transmit vapor while preventing liquid flow. The contact angle between such non-wetting material and the liquids contacting it in the cell should be at least about 100°, and preferably higher. Particularly suitable non-wetting materials include, for example, highly fluorinated polymers such as polytetrafluoroethylene, perfluoroethylene-perfluoropropylene copolymers, poly(chlorotrifluoroethylene), polyheptafluorobutyl acrylate, vinylidene fluoride-perfluoropropylene copolymers, polyperfluoropropyltriazines, trifluoronitrosomethane-tetrafluoroethylene copolymers, fluorinated polyethylene, and the like; hydrocarbon polymers such as polyethylene and polypropylene may also be used. The porous barrier may be constructed of the polymer itself, or may have a different material as substrate, which is coated with the polymer. For example, this substrate may be glass cloth, porous (sintered) glass, porcelain or the like, porous polyethylene or polystyrene, and so forth.

The pores of the porous barrier must be sufficiently small so that surface tension prevents the liquid contacting the barrier from entering the pores. Pore sizes effective for this purpose vary depending on the contact angle between the material of the porous barrier and the liquid contacting it. A polytetrafluoroethylene barrier with approximately 10-15 micron pores has been found satisfactory for use in conjunction with aqueous hydrazine feedstock and aqueous KOH electrolyte, for example.

To facilitate rapid transmission of the feedstock to the catalytic electrode surface, the thickness of the barrier should be as small as is consistent with preventing access of the liquid feedstock to the catalytic side of the separator. For example, a thickness in the range of 5 to 15 mils may be effective with a 15–50 micron range of pore size. Height and width of the barrier will be much greater than its thickness; these dimensions will be selected to accommodate the electrode and cell size.

The location of the catalyst will be at the surface of the porous barrier opposite that contacted by the feedstock. As noted above, particularly with liquid and soluble feedstocks, continued contact of the bulk feedstock with the catalyst is undesirable. Therefore contact with the catalyst should be limited as far as possible, by placing it only on the far side of the porous barrier.

The catalyst must be close to the porous barrier surface, and may advantageously be applied to the barrier surface. This may be done by means such as pressing a metallic catalyst to the porous barrier surface, or mixing finely divided catalyst with a binder by which it is adhered to the surface. For example, the finely divided catalyst may be mixed with powdered polytetrafluoroethylene and the mixture applied to the barrier surface, and compressed, at temperatures such as from 15° to 400° C., optimally 350–370° C., to produce adherence to the surface. The catalyst can also be deposited, by means such as electroplating, for example, on a foraminous carrier such as a current collector made of nickel, steel or the like in the form of a screen or mesh, which is pressed against the porous barrier.

The nature of the catalyst may vary, depending on the feedstock whose electrochemical utilization is to be catalyzed. For example, it may be a noble metal such as platinum, gold, rhodium, or, especially preferably, ruthenium, for a feedstock fuel such as hydrazine. For oxidants such as nitric acid and nitrogen tetroxide, a noble metal such as gold, platinum, rhodium, iridium, palladium and the like may be used as catalysts. Indeed, use of a metal catalyst is unnecessary for nitric acid utilization, where a permeable porous carbon current collector is being used. For hydrogen peroxide, silver is an effective catalyst. The noble metal catalysts may consists of a single metal or a combination of metals, such as Pd and Pt, Pt and Ru, or the like. Other catalytic materials, such as nickel-containing materials, are known for electrochemical use, and choice of a particular catalyst will depend on choice of the feedback in the cell.

Usually the catalyst will be in finely divided form, to maximize its surface area. Noble metal catalysts are usually preferably employed as the metal blacks, which are very fine, high surface area powder forms of the metals, which can be produced by chemical or electrochemical reduction of the metal salts. The metal catalysts may be supported, on carbon for example.

If the catalyst is a coherent conducting solid, it can serve as its own current collector. Otherwise, for example when the catalyst of the electrode is a finely divided powder, a current collector will be needed, which can be used to collect the current from the catalytic surface of the diffusion electrode and make the electronic connection to an external electrical circuit. This can be any conductive coherent structure permitting access of the electrolyte to the catalyst surface. For example, it may be a mesh or screen or a metal such as tantalum, stainless steel, or a like inert material; indeed, it may be a conductive carbon structure.

The method of construction and operation of fuel cells in accordance with this invention is particularly adapted for the utilization of hydrazine in a fuel cell, and more specifically, the utilization of aqueous hydrazine as a fuel in conjunction with a noble metal catalyst, particularly a transition metal catalyst (Group VIII of periods 5 and 6 of the Periodic Table), including catalysts such as rhodium, iridium and platinum, which tend to lose electrochemical activity on standing in contact with hydrazine. The present invention contemplates particularly the utilization of hydrazine as feedstock in conjunction with a ruthenium catalyst. Ruthenium, it has been discovered, when employed in the systems of this invention whereby the catalyst is separated from the fuel by a porous non-wetting separator, provides a stable electrode, while decomposition of the hydrazine is suppressed.

In this connection, the hydrazine employed as fuel is advantageously concentrated aqueous hydrazine, such as an aqueous solution which is 85% by weight hydrazine monohydrate, remainder water. If desired, the hydrazine may be supplied to the diffusion electrode in admixture with other materials. These may be, for example, electrolytes such as aqueous KOH, aqueous sulfuric acid or the like. They must be also mixtures of hydrazine with other fuel materials, which may or may not be electrochemically utilized in operation of the cell, depending on selection of catalysts. For example, mixtures of monomethylhydrazine and of unsymmetrical dimethylhydrazine with hydrazine may be supplied as the feedstock for the cell. Such mixtures, for example, are available as the propellant fuels for rocket drives and the like.

The present cells, in accordance with the broader aspects of this invention, may also if desired employ other liquid and soluble hydrazine compounds, such as dimethylhydrazine (sym- or unsym-), methylhydrazine, phenylhydrazine, hydrazine sulfate, phenyl hydrazine hydrochloride, p-hydrazinobenzenesulfonic acid, p-tolylhydrazine hydrochloride, p-bromophenyl hydrazine hydrochloride, 2-hydrazinobenzothiazole, 3-hydrazinoquinoline dihydrochloride, 2-hydrazinoquinoline, benzhydrazide, adipic dihydrazide, formohydrazide, semicarbazide hydrochloride, hydrazodicarbonamide and so forth. The fuel may also be a liquid and soluble organic compound in which hydrogen is bound to carbon, oxygen or both, such as methanol, ethanol, formaldehyde, formic acid, postassium formate, aminoethanol, ethylene glycol, glucose, glycerol, isopropanol, glycolic acid, allyl alcohol, acetone, maleic acid, oxalic acid, t-butanol, dioxane and the like.

A variety of oxidants which are liquid and soluble can be employed in the practice of the present invention, in conjunction with a catalytic diffusion electrode. These include, for example, oxidants such as nitric acid, dinitrogen tetroxide, and hydrogen peroxide.

Nitric acid employed as an oxidant with a diffusion electrode may be concentrated (16 M for example), or more dilute. If desired, nitric acid feed oxidant may be admixed with other substances, such as an electrolyte like sulfuric acid. Aqueous nitric acid as dilute as 1 M has no significant oxidizing properties in itself at 25° C., but 1 M nitric acid in 5 M $H_2SO_4$ is reduced at low temperatures such as 30° C., maintaining useful potentials at 100 milliamperes per square centimeter (ma./cm.$^2$). Also, if hydrazine gets into a dilute solution of $HNO_3$ in $H_2SO_4$, it is eliminated by precipitation as hydrazine sulfate, and will not interfere with the nitric acid reduction. As is known, nitric acid oxidant can also be regenerated in a redox system if desired, using air or oxygen as the regenerant.

While dinitrogen tetroxide is a gas, it is soluble in aqueous media, providing liquid and soluble feedstocks as contemplated in accordance with this invention. This oxidant may be utilized as a solution in water if desired: for example, it may be run into water to provide a 6.2 M hydrogen ion concentration, at which it will support current drains of up to 100 ma./cm.$^2$ sq. cm. with less than 0.1 volt polarization, at a gold catalyst. It can also be fed to the electrode as a solution in an electrolyte or oxidant such as aqueous 5 M phosphoric acid or 1 or 5 M nitric acid.

Still another oxidant of particular utility in the fuel cells of this invention is hydrogen peroxide, which may be employed for example in aqueous solution in strengths such as 30%, 60% or 90%.

It is to be appreciated that the method of the present invention may be practiced with an electrode and feedstock in accordance with this invention, in which a liquid and soluble feedstock is fed to a porous, liquid-impermeable catalytic diffusion electrode, coupled through an electrolyte to gaseous feedstocks such as hydrogen, oxygen, and the like, supplied to a gas electrode, or to other known electrochemical systems, such as an electrode immersed in a soluble feedstock solution and in contact with an electrolyte. In my copending application S.N. 349,127, filed Mar. 3, 1964, I have described a system which, for example, may advantageously be employed in this connection. The stated application relates to operation of a fuel cell using a palladium membrane between a source of chemically combined hydrogen and the electrolyte. The source of chemically combined hydrogen is dehydrogenated at a catalytic surface of the Pd membrane, and the membrane transports the hydrogen to the electrolyte, where it is electrochemically oxidized. The stated Pd membrane fuel electrode may be used with an oxidant electrode in accordance with the present invention, in which a liquid and soluble feedstock such as hydrogen peroxide is transmitted to the electrolyte contacting both electrodes by a vapor diffusion electrode comprising a porous barrier to liquid flow as herein above described.

The electrolytes which may be employed in accordance with the present invention may be liquid or solid electrolytes. Generally, with the liquid feedstocks used in accordance with the present invention, the electrolyte will either be an ion exchange membrane or an aqueous solution of an ionizable acid, base or salt. For example, these may be concentrated aqueous solutions of acids such as 5 M phosphoric acid, 5 M nitric acid, aqueous bases such as 1 M KOH, or the like. The ion exchange membranes used in practicing the method of this invention may be anion or cation exchange membranes. With a cation exchange membrane, using $N_2H_4$ as the feedstock, the $N_2H_5^+$ ion can be transported to the other side of the membrane, whereas with an anion exchange membrane, it may be possible to limit the ion transported to the hydroxyl ion, thereby causing the cells employing oxidants such as hydrogen peroxide or oxygen to produce water as the electrochemical reaction product. Useful membranes may be produced, for example, by sulfonating and aminomethylating a cross-linked polystyrene to provide anion and cation exchange sites, and thereafter mixing the resulting resin with an inert thermoplastic binder such as granular polytetrafluoroethylene, and heating and compressing the mixture to form a coherent membrane. As is known in the art, ion exchange membranes for use in fuel cells are usually equilibrated with acid or base before use, and may require humidification of anhydrous feedstocks to maintain their active condition.

Particular combinations of fuel, oxidants and electrolytes which are advantageous depend on considerations such as the reactions occurring upon combination of a particular set of materials. For example, since nitric acid reacts with base, a basic electrolyte used with the fuel feedstock may restrict the oxidant to oxidizers unreactive with base, such as hydrogen peroxide or oxygen.

The cell may advantageously be heated during operation. Conducting the electrochemical reactions at more elevated temperatures than ambient may produce better potentials or help maintain steady potentials, limiting polarization of the electrode. Heating the cell may also facilitate transfer of liquid and soluble feedstocks through the separator to the active catalyst surface at which the electrochemical reaction occurs, by raising the feedstock vapor pressure. Accordingly, it is frequently beneficial to operate the fuel cells of the present invention at temperatures above the usual ambient temperatures of 25–30° C., and indeed, at temperatures of up to 90–100° C. for example.

As noted above, operation of the cells involves supplying the feedstocks to the respective corresponding electrodes contacting the electrolyte, completing the electrical circuit by connecting the electrodes electronically outside the cell, for example by connecting them to an electronic circuit which runs on electrical power, and withdrawing reaction products from the cell. The individual cells will ordinarily be assembled in a battery, providing increased amperage and/or voltage output, and so forth.

The invention is illustrated but not limited by the following examples.

Example 1

A rhodium diffusion anode is prepared by coating a polytetrafluoroethylene "Teflon" impregnated glass cloth disk, about 2.9 cm.$^2$ area, 6 mils thick, with 15 micron pores, with 0.068 grams of powdered rhodium black, prepared by dissolving $RhCl_2$ in water and adding sodium borohydride. Stainless 304 steel screen, 4 mils thick with 65% open area, electrolytically plated with rhodium black, is laid over the rhodium powder, and the assembly is compressed at 815 pounds per square centimeter and 30° C.

A gold diffusion cathode is prepared by assembling a similar "Teflon" porous disk with 0.105 gram of gold black and a gold plated stainless steel screen as described above.

An electrolytically connected electrode assembly is prepared by placing an asbestos mat ½₂ inch thick between two cation exchange membranes, and placing the above-described anode and cathode respectively on either outer side of the membranes, with the electrode sides coated with the metal blacks facing towards the ion exchange membranes. The central asbestos mat is wetted with 1 M $H_2SO_4$.

A fuel cell is now provided by connecting a fuel vessel containing 85% aqueous hydrazine monohydrate and an oxidant vessel containing 16 M $HNO_3$ respectively to the anode and the cathode sides of the stated electrode assembly. The liquid fuel and oxidant contact the electrode assembly sandwiched between the vessels over about a 2.9 cm.$^2$ circular area through port openings in the vessels. The cell temperature is approximately ambient room temperature, about 25° C., during the run described below. The cell is connected to an external load and a voltmeter while readings of its output are taken. The cell remains continuously on 50 milliamperes current drain throughout the duration of the test, except for occasional interruptions (0.25 hour maximum) to take open circuit voltage readings. Fresh fuel and oxidant are added 65 hours after initiation of the run. The cell voltage on load remains above 1 volt for the 95-hour duration of the run.

Example 2

A cell is constructed similarly to the cell of Example 1. The fuel feed is 85% aqueous $N_2H_4 \cdot H_2O$, and the anode is 15 micron pore "Teflon" impregnated glass cloth coated with 0.096 g. of powdered ruthenium black catalyst, pressed to a stainless steel screen coated with ruthenium black. The catalyst side of the anode faces an electrolyte compartment (a tube, 7 cm. by 2.9 cm.$^2$) containing 5 M KOH. This contacts the catalyst-coated side of 9 micron pore porous "Teflon" coated with powdered gold black pressed to a stainless steel screen electroplated with gold black. The oxidant feed to the back side of this cathode is gaseous $N_2O_4$.

At 45°, the open circuit voltage of this cell is 1 volt, with an anode (IR-free) voltage of −0.7 v. and a cathode (IR-free) voltage of +0.4 volt. At a 20 ma. current drain, the cell sustains a voltage, including IR drop, of 0.9 v., with (IR-free) anode and cathode voltages of −0.6 v. and +0.3 v. respectively.

Example 3

An anode is constructed by assembling 9 micron pore "Teflon" with platinum black and platinized stainless steel screen. The uncoated side is placed in contact with 85% aqueous hydrazine hydrate, and the catalyst-coated side, with 5 M $H_2SO_4$. A cathode is constructed by assembling 9 micron pore size "Teflon" with powdered gold black and a stainless steel screen electroplated with gold black. The coated side of the cathode contacts the stated 5 M $H_2SO_4$ solution, and the back side contacts 70% (15.8 M) aqueous $HNO_3$.

This cell produces a sustained voltage at a current density of 100 ma., at 95° C.

Substituting 1 M $H_3PO_4$ for the $H_2SO_4$ electrolyte results in lowered voltages.

Example 4

A cell is prepared by compressing electrodes as described above. The anode catalyst is rhodium, and the cathode catalyst is gold, each on 9 micron pore "Teflon" pressed to stainless steel mesh current collectors. The electrolyte contacting the catalyst side of both electrodes is 5 M $H_2SO_4$, the fuel is 85% aqueous hydrazine hydrate, and the oxidant is 70% aqueous $HNO_3$.

The open circuit voltage of this cell is 0.8 v. at 45° C., and at a current drain of 30 ma. at 70° C., its voltage is 0.5 v.

Example 5

This example illustrates use of the method of this invention in a cell in which the anode is a non-porous electrode, and the cathode is a diffusion electrode in accordance with this invention.

To provide the anode for the cell, a Pd sheet 1 mil thick is plated on both sides with rhodium black by electroplating the membrane at about 65 ma./cm.$^2$ from an 0.05 M rhodium chloride solution until the membrane is completely black, which requires about a half hour on each side.

To provide the cathode for the cell, a mixture of 0.13 g. Ag powder and 0.13 g. powdered polytetrafluoroethylene is spread between a disc of No. 316 stainless steel mesh and a disc of 6 mil thick porous glass cloth coated with polytetrafluoroethylene (15 micron holes), and the assembly is compressed under 5000 pounds per square inch pressure for 15 minutes at 225° C.

The cathode and anode are assembled with annular gaskets of a silicone rubber between them, spacing them apart at a distance of about 3/32 inch, and the space between is filled with 1 M KOH. The silver-coated side of the cathode faces the inside, contacting the KOH electrolyte. The outer side of the Pd anode contacts a circular port in a fuel vessel, and the outer side of the cathode contacts a circular port in an oxidant vessel. The circular port openings are each approximately 2.5 square centimeters in area.

The fuel vessel is filled with an 85% aqueous solution of hydrazine monohydrate, and the oxidant vessel is filled with aqueous 30% hydrogen peroxide. The Pd anode and the cathode assembly are connected into an electrical circuit including means by which the voltage at different current drains can be measured. The equipment is thermostated for temperature control.

The open circuit voltage of the cell at 25° C. is 0.99 volts. At approximately 55° C., during a 3 hour run, it produces 0.8 volts at 50 ma. current drain.

While the invention has been described with particular reference to specific preferred embodiments thereof, it will be appreciated that modifications and variations can be made without departing from the scope of the invention as disclosed herein, which is limited only as indicated in the following claims.

What is claimed is:

1. In the method for operating a fuel cell having catalytic electrodes comprising an anode and cathode and wherein an aqueous solution of hydrazine is supplied to said anode and an oxidant feedstock is supplied to said cathode and said cathode is in electrolytic contact with said anode through an electrolyte, the improvement which comprises supplying said aqueous solution of hydrazine to said anode to a barrier which consists essentially of a first porous, nonwetting vapor transmitting layer, permeable only to vapor, a second layer containing a metallic catalyst for the oxidation of hydrazine, passing hydrazine through said first layer into said second layer in a vapor phase and a third current collector layer for the anode.

2. The method of claim 1 wherein said metallic catalyst is ruthenium.

3. The method of claim 1 wherein said metallic catalyst is rhodium.

4. The method of claim 1 wherein said oxidant feedstock is nitric acid.

5. The method of claim 1 wherein said oxidant feedstock is hydrogen peroxide.

6. A method of operating a fuel cell having catalytic electrodes comprising an anode and cathode which comprises the steps of:
   (a) supplying an oxidant feedstock selected from the group consisting of nitric acid and hydrogen peroxide to said cathode,
   (b) supplying an aqueous solution of hydrazine to said anode by way of a barrier which consists essentially of a first porous, nonwetting vapor transmitting layer permeable only to vapor, a second layer containing ruthenium as a metallic catalyst for the oxidation of hydrazine, passing hydrazine through said first layer into said second layer in a vapor phase and a third current collector layer for the anode.

References Cited

UNITED STATES PATENTS

| | | | |
|---|---|---|---|
| 3,097,116 | 7/1963 | Moos | 136—86 |
| 3,121,031 | 2/1964 | Gruneberg et al. | 136—86 |
| 3,188,241 | 6/1965 | Weiss et al. | 136—86 |
| 3,252,837 | 5/1966 | Satterfield et al. | 136—86 |
| 3,266,939 | 8/1966 | Adam et al. | 136—86 |
| 3,276,909 | 10/1966 | Moos | 136—86 |

ALLEN B. CURTIS, *Primary Examiner.*

WINSTON A. DOUGLAS, *Examiner.*

H. A. FEELEY, *Assistant Examiner.*